(12) United States Patent
Fleury

(10) Patent No.: US 7,045,581 B2
(45) Date of Patent: May 16, 2006

(54) METHOD FOR CARRYING OUT POLYMERIZATION REACTIONS

(75) Inventor: Pierre-Alain Fleury, Ramlinsburg (CH)

(73) Assignee: List AG, Arisdorf (CH)

( * ) Notice: Subject to any disclaimer, the term of this patent is extended or adjusted under 35 U.S.C. 154(b) by 0 days.

(21) Appl. No.: 10/476,235

(22) PCT Filed: May 8, 2002

(86) PCT No.: PCT/EP02/05073

§ 371 (c)(1),
(2), (4) Date: Oct. 29, 2003

(87) PCT Pub. No.: WO02/090391

PCT Pub. Date: Nov. 14, 2002

(65) Prior Publication Data

US 2004/0143075 A1    Jul. 22, 2004

(30) Foreign Application Priority Data

| May 9, 2001 | (DE) | ................................ 101 22 571 |
| Aug. 16, 2001 | (DE) | ................................ 101 40 217 |
| Nov. 6, 2001 | (DE) | ................................ 101 53 966 |

(51) Int. Cl.
*C08F 2/22* (2006.01)

(52) U.S. Cl. ............................. 526/65; 526/75; 526/78; 526/232.3

(58) Field of Classification Search .................. 526/65, 526/75, 78, 232.3
See application file for complete search history.

(56) References Cited

U.S. PATENT DOCUMENTS

| 4,098,841 | A | * | 7/1978 | Nagata et al. | ............... 525/530 |
| 4,833,221 | A | * | 5/1989 | Albrecht | ...................... 526/64 |
| 5,378,776 | A | * | 1/1995 | Matsumura et al. | .......... 526/64 |
| 5,391,631 | A | * | 2/1995 | Porsch et al. | ................ 525/303 |
| 5,994,492 | A | * | 11/1999 | Graham et al. | ................ 528/76 |

FOREIGN PATENT DOCUMENTS

| CH | 659646 | * | 2/1987 |
| CH | 691572 | * | 8/2001 |

* cited by examiner

*Primary Examiner*—Bernard Lipman
(74) *Attorney, Agent, or Firm*—Bachman & LaPointe, P.C.

(57) ABSTRACT

A method for carrying out homogenous polymerization reactions in a reactor, wherein monomers and/or prepolymers are fed (apportioned). In a first step, an initiator is optionally admixed with the monomer and/or prepolymer. In a second step, once viscosity is substantially higher, a solvent is added thereto and/or the monomer itself is partially evaporated, it is condensed externally and/or internally and fed back into the reactor.

6 Claims, No Drawings

METHOD FOR CARRYING OUT POLYMERIZATION REACTIONS

BACKGROUND OF THE INVENTION

The invention relates to a method of carrying out polymerization reactions in a reactor, with monomers and/or prepolymers being introduced (metered) into the reactor.

Polymerization comprehends the conversion of low molecular mass compounds (monomers, oligomers) into high molecular mass compounds (polymers, macromolecules). Industrially, polymers can be prepared under heterogeneous or homogeneous conditions. By heterogeneous reactions are meant polymerization in suspension/emulsion and precipitation reactions. These polymerization methods in suspension/emulsion are normally carried out in stirred tanks.

Precipitation polymerization takes place frequently using the thermodynamic separation of the polymer from its monomer and/or from a solvent. A prerequisite for this is that the polymer is insoluble in the monomer or solvent. In this type of preparation the polymer is precipitated.

Heterogeneous polymerization is normally realized on belt reactors [for PIB (polyisobutylene), PVBE (polyvinyl isobutyl ether)] or in kneading reactors [for SPS (syndiotactic polystyrene), POM (polyoxymethylene)]. In the belt reactor, owing to the large vapor passages, it is possible to control the polymerization temperature by evaporation of the solvent, but there is no movement of material and hence also no renewal of product surface. In the conventional kneading reactors (e.g., those from the companies Kurimoto and Mitsubishi Heavy Industries), on the other hand, an intensive renewal of product surface takes place, but there are no vapor passages present for evaporative cooling, so that the heat can be taken off only via contact with the cooled double jacket.

Polymerization reactions under homogeneous conditions have to date taken place only above the glass transition temperature or melting point of the polymer, i.e., they are realized in the melt. The company Sulzer Chemtec has developed, for example, a continuous, homogeneous polymerization of styrene and MMA (methyl methacrylate) in a circulation reactor with static mixing elements. This process requires high temperatures in order to keep the viscosity of the reaction mass low and so to avoid deposits on the reactor walls and on the mixing elements. Such high temperatures, however, have unwanted side effects, such as the formation of oligomers or depolymerization.

It is an the object of the present invention to provide a method of the type specified above in which the polymerization reaction under homogeneous conditions is substantially improved.

SUMMARY OF THE INVENTION

Contributions toward achieving this object include the admixing, where appropriate, of an initiator to the monomer and/or prepolymer in a first stage and the addition thereto of a solvent not until a second stage, when the viscosity is substantially higher, and/or the partial evaporation of the monomer itself, its external and/or internal condensation, and the recycling of the condensate to the reactor.

DETAILED DESCRIPTION

It is known that the addition of a solvent makes the reaction slower, since the solvent must be evaporated. In accordance with the invention the method is to manage without solvent in the first phase. The implication of this is that the reaction proceeds approximately four times more quickly, since the concentration of the monomer and/or prepolymer is higher. Moreover, the desired viscosity is achieved substantially more rapidly as a result. Only when the viscosity has reached a certain level is the solvent added, the purpose of the solvent being essentially only to cool the mass.

The consequence of this method of the invention is that substantially less solvent is needed, since the solvent evaporates on the surface of the mass and cools the mass. Furthermore, it is irrelevant whether the solvent used is good or not so good, since the solvent is immediately evaporated again and drawn off, i.e., recycled.

For example, a solvent is added to a PMMA mass at a temperature of 90°. This solvent cools the mass to 60°, the PMMA undergoing granulation at 60°. The solvent also evaporates, however, at 40° too.

In a further example of the invention, for which protection is also sought independently, the polymerization is to take place, in the case of amorphous polymers, below the glass transition temperature or, in the case of crystalline polymers, below the melting point.

Polymerization preferably takes place directly to the granule state.

By the glass transition temperature is meant the temperature at which amorphous or partly crystalline polymers undergo transition from the liquid or rubber-elastic state to the hard-elastic or glassy state, or vice versa. In accordance with the present invention the polymer mass in the reactor is granulated by a cutting or distributing effect/comminuting effect of stirrers. The monomer continues to undergo polymerization in the resultant granules.

For carrying out the method of the invention it is preferred to employ twin-shaft kneading reactors, as shown for example in DE 199 40 521 A1 or DE 41 18 884 A1. These reactors have the advantage both of a large vapor passage for evaporative cooling and of an optimum renewal of product surface. By virtue of the large vapor passage of the kneading reactor it is possible to utilize evaporative cooling to remove the heat of reaction and the kneading energy which is produced until the granulation point is reached.

The kneading reactor is optimized in respect of self-cleaning and the avoidance of dead zones. Furthermore, the form of the kneading bars has been chosen such that mutual engagement of the kneading bars or stirring bars is not accompanied by any compression zones. Accordingly the homogeneous polymer mass can be granulated without local overheating, induced by excessive kneading energy and grinding action.

The overall method is intended to run continuously. The pasty mass is conveyed specifically, axially. A variety of shaft geometries can be chosen here. The conveying angles of the kneading bars are adaptable and serve to convey the mass axially within the reactor. Another possibility, furthermore, is that of installing back-conveying zones, which control the fill level within the reactor.

Particularly in the case of methods and/or products which are required to spend a very long residence time within the kneading reactor it is possible to supply the kneading reactor with a prepolymer instead of with monomers. This means that prior to the actual polymerization in the kneading reactor there is a prepolymerization in a corresponding tank.

EXAMPLE

In a twin-shaft kneading reactor according to DE 41 18 884 A1 a homogeneous polymerization of MMA (methyl methacrylate) is carried out below the glass transition point (Tg=105° C.). The kneading reactor was charged with MMA as monomer, diethyl ether as solvent, and with Perkadox 16 (Elf-Atochem) as initiator. The wall temperature was set at 38° C. and the stirrer speed at 30 rpm. The liquid mass was flushed with nitrogen at 5° C.

After 200 minutes the viscosity of the mass had risen to such an extent that it wound around the stirring shafts. After 308 minutes the polymer mass began to undergo granulation and after 330 minutes had been entirely converted to free-flowing granules. The kneading energy in this conversion phase was measured at 0.35 MJ/kg. After 340 minutes the granules were discharged and found to have the following properties:

Conversion of 97%
Molecular mass 255 000 g/mol
Polydispersity index 2.5
Residual solvent content of 7%.

The product temperature was controlled by means of evaporative cooling in the range from 42° to 60° C. The change in amount of condensate over time, and the change in product temperature over time, suggest a strong Trommsdorf effect.

The invention claimed is:

1. A method for the homogeneous prepolymerization of a feed comprising at least one of a monomer and a prepolymer in a reactor comprising the steps of:
   providing a two stage reactor;
   feeding a feed comprising at least one of a monomer and a prepolymer to a first stage of the reactor;
   admixing an initiator without solvent with the feeding in the first stage of the reactor to obtain a product of desired viscosity;
   contacting the surface of the product coming from the first stage with a solvent wherein the solvent evaporates on the surface of the product and cools same while maintaining the desired viscosity of the product;
   polymerizing in a second stage the cooled product at a temperature T, wherein T is (1) below the glass transition temperature in the case of amorphous polymers and (2) below the melting point in the case of crystalline polymers wherein, the polymerization proceeds to a granular state in the reactor; and
   recycling the evaporated solvent.

2. The method of claim 1, wherein the product in the reactor is agitated.

3. The method of claim 1, wherein the polymerization is carried out continuously.

4. The method of claim 1, wherein the polymerization takes place in a twin-shaft kneading reactor.

5. The method of claim 1, wherein, prior to the polymerization in the reactor, a prepolymerization takes place in a tank.

6. A method for the homogeneous polymerization of a feed comprising at least one of a monomer and a prepolymer in a reactor comprising the steps of:
   providing a two stage reactor;
   feeding a feed comprising at least one of a monomer and a prepolymer to a first stage of the reactor;
   admixing an initiator without solvent with the feeding in the first stage of the reactor to obtain an intermediate product of desired degree of polymerization;
   contacting the surface of the product coming from the first stage with a solvent wherein the solvent evaporates on the surface of the product and cools same;
   polymerizing the intermediate product in a second stage the cooled product at a temperature T, wherein T is (1) below the glass transition temperature in the case of amorphous polymers and (2) below the melting point in the case of crystalline polymers wherein, the polymerization proceeds to a granular state in the reactor; and
   recycling the evaporated solvent.

* * * * *